(12) United States Patent
Remick

(10) Patent No.: US 10,375,923 B2
(45) Date of Patent: Aug. 13, 2019

(54) CAT LITTER BOX

(71) Applicant: Karen Remick, Fairbanks, AK (US)

(72) Inventor: Karen Remick, Fairbanks, AK (US)

( * ) Notice: Subject to any disclaimer, the term of this patent is extended or adjusted under 35 U.S.C. 154(b) by 168 days.

(21) Appl. No.: 15/674,201

(22) Filed: Aug. 10, 2017

(65) Prior Publication Data

US 2019/0045738 A1 Feb. 14, 2019

(51) Int. Cl.
*A01K 1/00* (2006.01)
*A01K 1/01* (2006.01)

(52) U.S. Cl.
CPC .................................. *A01K 1/0114* (2013.01)

(58) Field of Classification Search
CPC .................................. A01K 1/00; A01K 1/03
USPC ................... 119/161, 162, 165–170, 28.5
See application file for complete search history.

(56) References Cited

U.S. PATENT DOCUMENTS

| | | | | |
|---|---|---|---|---|
| 4,469,046 A * | 9/1984 | Yananton | ............. | A01K 1/0107 119/169 |
| 4,649,578 A * | 3/1987 | Vargo | .................. | A01K 1/0114 119/161 |
| 5,042,430 A * | 8/1991 | Casmira | ............... | A01K 1/0107 119/161 |
| 5,293,837 A * | 3/1994 | Caldwell | ............. | A01K 1/0114 119/166 |
| 5,355,837 A * | 10/1994 | Reyes | .................. | A01K 1/0107 119/161 |
| 5,458,089 A * | 10/1995 | Rymer | ................. | A01K 1/0121 119/162 |
| 5,806,461 A * | 9/1998 | Kiera | ................... | A01K 1/0107 119/165 |
| 6,135,057 A | 10/2000 | Cummings | | |
| 6,332,429 B1 * | 12/2001 | Gramlich | ............. | A01K 1/0107 119/165 |
| 7,434,539 B2 * | 10/2008 | Gloor | .................... | A01K 1/011 119/165 |
| 8,360,006 B2 * | 1/2013 | Lechaton | ............. | A01K 15/024 119/161 |
| 8,468,973 B2 * | 6/2013 | Sasano | ................. | A01K 1/0157 119/171 |
| 8,707,901 B2 * | 4/2014 | Matsuo | ................ | A01K 1/0107 119/166 |

* cited by examiner

*Primary Examiner* — Richard T Price, Jr.
(74) *Attorney, Agent, or Firm* — MU P.C.

(57) ABSTRACT

A cat litter box has a bath tub form having a circumferential lip having an underside, a raised perimeter extending upwardly from the lip, the raised perimeter having top edge, and a circumferential groove on the underside of the lip, a lid having an aperture therein, the lid configured to fit within the raised perimeter and rest on the lip, the aperture configured to permit ingress and egress of a cat, and a plurality of fasteners having an upper appendage and lower appendage, wherein the upper appendage is configured to extend over the perimeter, and the lower appendage comprises a protrusion configured to engage with the groove. The lid may also have a grate that is porous, or it may be textured and porous, to help remove litter from a cat's feet as it comes out of the litter box.

8 Claims, 6 Drawing Sheets

CAT LITTER BOX

BACKGROUND OF THE INVENTION

1. Field of Invention

The present invention relates to the field of cat litter boxes, and more particularly to a cat litter box that prevents litter from being scattered about and other animals from accessing the litter.

2. Description of Related Art

Conventionally, litter boxes are indoor solid and liquid waste collection boxes that are commonly used by cats. Cats may enter the litter box to relieve themselves of waste, without having to go outside. Because cats naturally excrete in soft soil which permits easy burial of the waste, the litter box is filled with a litter box filler commonly made of a loose granular material that absorbs moisture and odor. Waste may collect in the litter box for a period of time until cleaning is eventually required.

Litter boxes are generally constructed with a base integrally molded to surrounding walls that retain the filler within the box. The box may have a lid with an aperture for the cat to ingress and egress from the litter box. Alternatively, the aperture may be positioned on one of the sidewalls. Litter scatter around the box is a problem due to the activity of the animals within the litter box, and the fine granularity of litter. In addition, most regular litter boxes are shallowly filled, because of their low sidewalls, which makes cat sand sticking to the bottom of the box a problem.

A common problem with the aforementioned design is that other animals, namely dogs, can access the litter box. Unfortunately, dogs are naturally drawn to and even enjoy the cat excrement causing numerous health problems. Specifically, canine coprophagia may cause intestinal blockage, and promote the transmission of parasites present in cat feces such as a *Toxoplasma gondii*.

Based on the foregoing, there is a need in the art for a cat litter box that can be utilized by cats while restricting other animals from accessing the waste contents stored therein.

SUMMARY OF THE INVENTION

A cat litter box has a bath tub form having a circumferential lip having an underside, a raised perimeter extending upwardly from the lip, the raised perimeter having top edge, and a circumferential groove on the underside of the lip, a lid having an aperture therein, the lid configured to fit within the raised perimeter and rest on the lip, the aperture configured to permit ingress and egress of a cat, and a plurality of fasteners having an upper appendage and lower appendage, wherein the upper appendage is configured to extend over the perimeter, and the lower appendage comprises a protrusion configured to engage with the groove.

The removable lid may be configured to mate with the lip and raised perimeter such that a top surface of the lid is coplanar with the top edge of the raised perimeter. The lid may have a grate that is textured. The lid may also have a grate that is porous, or it may be textured and porous, to help remove litter from a cat's feet as it comes out of the litter box. The aperture may be positioned centrally in the lid such that there is some grate material between an edge of the lid and the aperture.

In an embodiment, the protrusion pivotally engages with the receiving notch to form a hinge.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
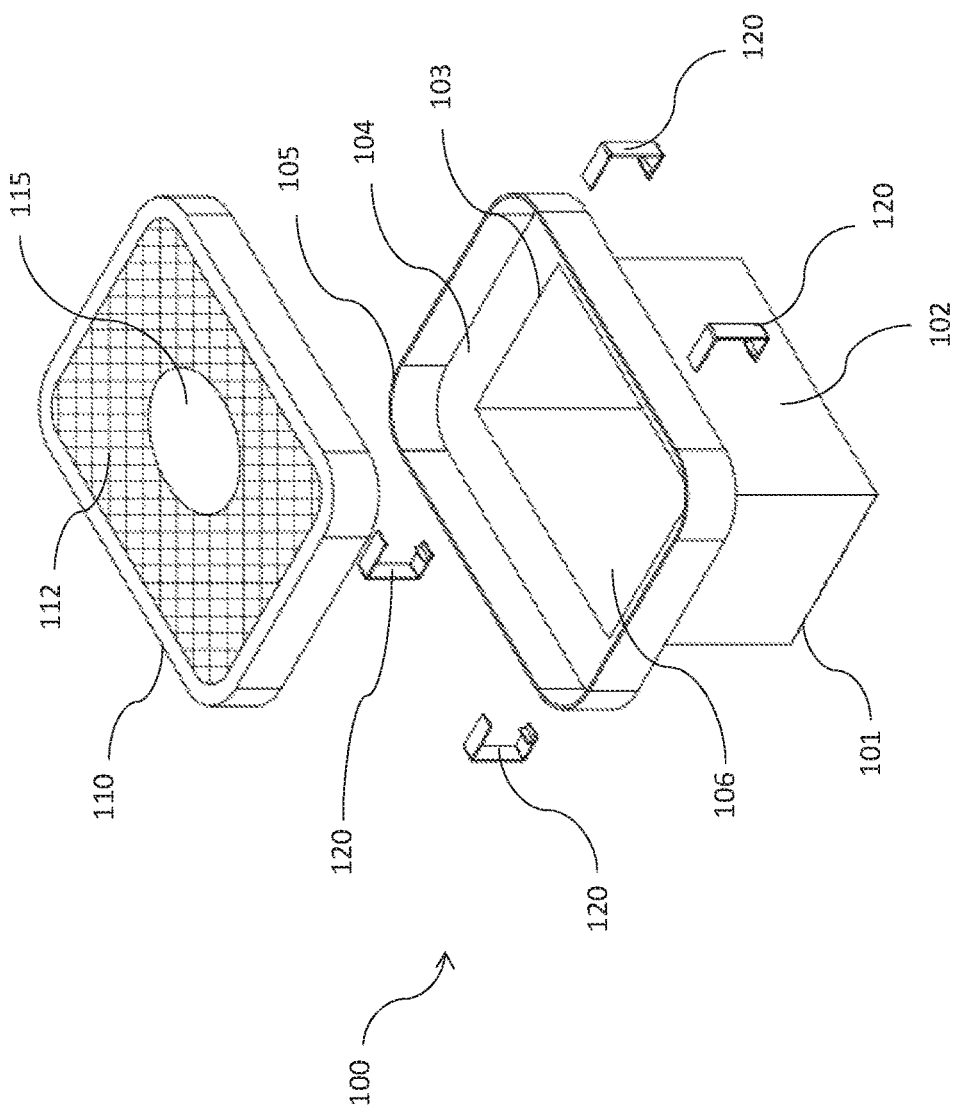
FIG. 1 is a perspective exploded view of the device, according to an embodiment of the present invention.

Preferred embodiments of the present invention and their advantages may be understood by referring to FIGS. 1-6, wherein like reference numerals refer to like elements.

In general, the invention described herein relates to a cat litter box designed to allow cats to enter and exit, while preventing dogs and other animals from accessing the filler and waste therein. The cat litter box 100 is preferably, but not necessarily, rectangular in shape. Alternate embodiments may be circular, or any suitable geometric shape wherein filler may be retained within.

In reference to FIG. 1 the cat litter box 100 is illustrated in an embodiment of the present invention. A box 101 having a horizontal bottom wall (not shown) sidewalls 102 extending substantially perpendicularly therefrom. The box 101 retains and collects the granular litter box filler and any excrement from the cat. The box 101 is a molded bathtub form that prevents litter scatter, and, in an embodiment, has smoothed corners to prevent accumulation of old litter. In an embodiment, the litter box is deep in comparison with prior art litter boxes, as it permits the addition an adequate amount of litter in it to prevent caking and sticking to the bottom, which also makes cleaning the box 101 easier.

The sidewalls 102 extend upwardly and meet in rounded corners 107 (shown in FIG. 6) to prevent the accumulation of litter in inaccessible corners. Each sidewall 102 terminates in a continuous rim 103 having a lip 104, extending substantially outwardly and perpendicularly therefrom, such that the lip 104 is on a parallel plane with the horizontal bottom wall. Preferentially, the lip 104 extends from each sidewall 102 and has a raised perimeter 105 extending substantially perpendicular from the lip 104, such that the raised perimeter 105 is parallel to the sidewalls 102. Each of the horizontal base, sidewalls 102, lip 104, and raised perimeter 105 are affixed, integrally molded, or otherwise in communication such that they define an interior 106 of the cat litter box 100. The interior 106 is dimensioned to retain and collect litter filler as well as excrement such as urine and feces from a cat. The interior 106 must be large enough for a cat to stand inside and move as needed throughout the natural process of excretion. The raised perimeter 105 defines an aperture such that there is no attached wall opposing the horizontal bottom wall.

In further reference to FIG. 1, a removable lid 110 component is suitably dimensioned to rest upon the lip 104 and retained within the raised perimeter 105 of the box 101. In an embodiment, the lid 110 has rounded corners. In this manner, the removable lid 110 mates with the lip 104 and raised perimeter such that the top surface of the lid 110 is coplanar with the top edge of the raised perimeter 105. This enables the lid 110 to be positively retained with in the perimeter 105. The height of the lid 110 corresponds with the depth of the perimeter, such that the top of the lid is flush with the perimeter 105. The lid 110 is held in place by a plurality of fasteners 120. Once the lid 110 is positioned on the lip 104 and within the raised perimeter 105, one or more fasteners 120 may be mounted to retain the lid 110 in a fixed position.

The removable lid 110 may substantially be a grate 112 having an aperture 115 adequately sized to permit a cat to ingress and egress therethrough. The aperture 115 may be positioned near the center of the lid 110 to promote the cat stepping on the grate 112 upon ingress and egress through the aperture 115. The aperture 115 is positioned so only medium and large dogs would be able to reach it, and sized small enough to prevent the head of a large or medium sized dog from entering. The position of the aperture requires a cat step onto the grate 112 when egressing the litter box 100. The grate 112 may be textured such that as the cat steps upon it, particles are removed from the cat's paws.

The central positioning of the aperture may further aid in prohibiting unwanted animals such as dogs, from accessing the interior 106 of the litter box. The grate also prevents small dogs from walking towards the aperture across the lid. The height of the walls makes the lid difficult to get to, and dogs do not like walking on grating. Further, the high walls and grating on the lid prevent litter scatter when the cat kicks the litter to cover what was emitted.

In an embodiment, each sidewall 102 extends generally vertically on a continuous plane allowing for easy cleaning of the litter box. In this manner, the one may clean the litter box with an appropriately sized means for cleaning without having to navigate and bumps, ridges, or channels on the shape of the sidewalls 102.

Figure 2:
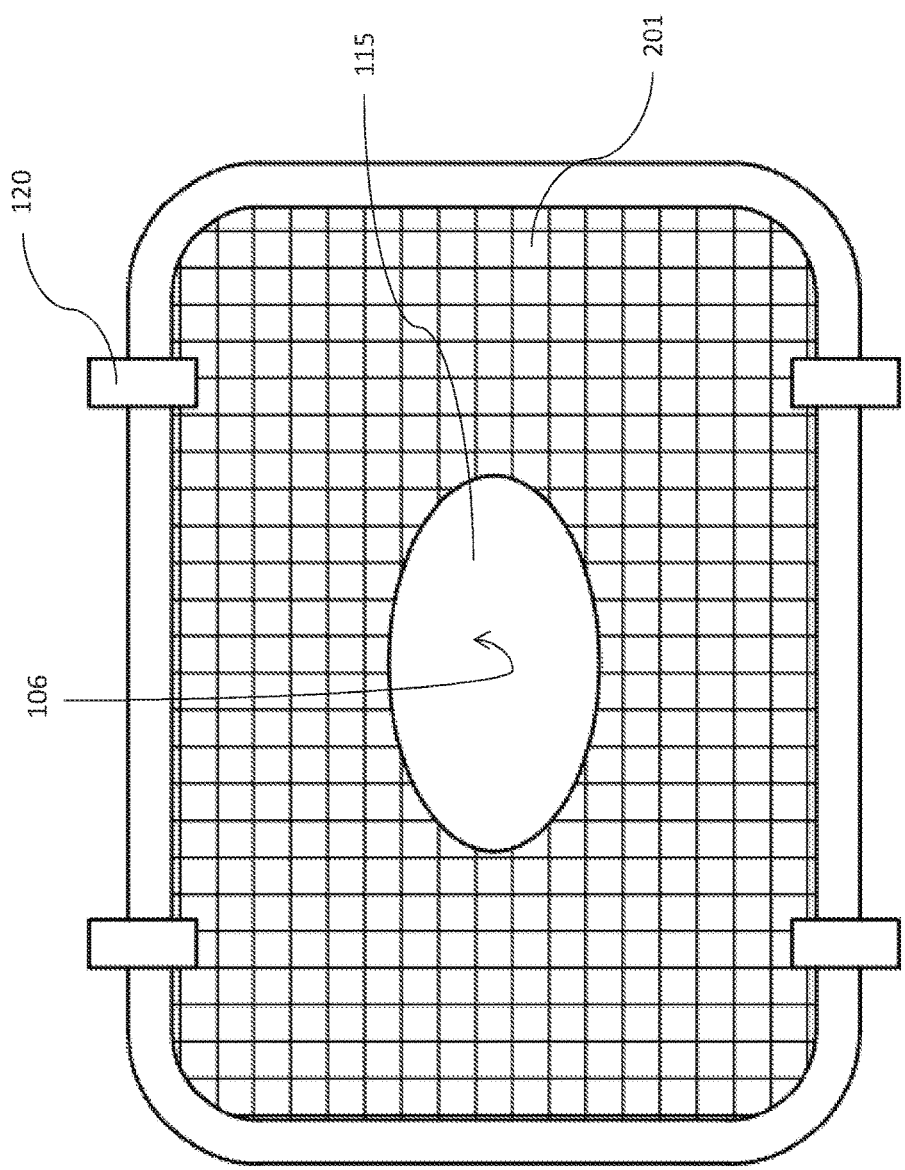
FIG. 2 is a top plan view of the device with the lid engaged, according to an embodiment of the present invention.

In reference to FIG. 2, a top plan view of the device 100 having the lid positioned upon and fastened to the box 101. The grate 112 has a porous top surface to permit particles stuck to the paws of the cat to fall into the interior 106. Pores 201 are sized such that particles, namely litter box filler, may fall through while the cat's paws, and animals aside from cats, are retained atop lid 110 or outside of the device 100. In an embodiment, the lid comprises an aperture 115 therein for entry and exit of an animal, wherein the edges of the aperture 115 are curved to prevent injury to an animal.

In an embodiment, the grate 112 has a grate frame defining the perimeter of the grate 112, and provides stability for interior of the grate. The grate frame provides a means for coupling and supporting the grate 112 with the frame as well as coupling the lid 110 with the box 101, lip 104, and raised perimeter 105.

In an embodiment, the grate may be a grid of perpendicular members equally interspaced from one another. In further embodiments, the grid may have a checkerboard-like pattern of protrusions with apertures spaced therebetween to promote cleaning of the cat's paws after use of the litter box. The protrusions may also serve to prevent litter filler from being kicked or tracked out of the box.

Figure 3:
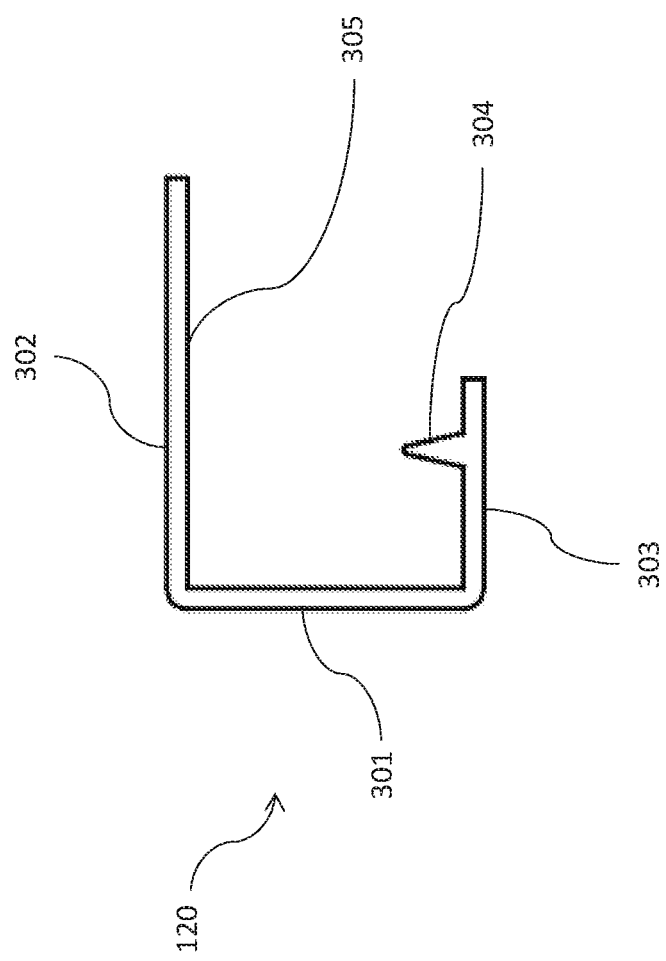
FIG. 3 is a side elevation view of the fastener, according to an embodiment of the present invention.

Now referring to FIG. 3, a side elevation view of the fastener 120 is illustrated. In a preferred embodiment, each of the plurality of fasteners 120 has two outwardly extending appendages extending substantially perpendicularly from opposite ends of a central portion 301. At least one of the appendages is a fastening portion 303 and at least one appendage is a mating portion 302, wherein the central portion 301 separates each of which. The central portion 301 is substantially perpendicular to the mating 302 and fastening portions 303. An inner surface 305 of the fastener 120 extends continuously along each portion 301, 302, 303. At least one appendage, and in a preferred embodiment the fastening portion 303 has a protrusion or tooth 304 extending from the inner surface 305.

In an embodiment, the fastener 120 is made of a semi-flexible material, such as molded plastic or bent metal, to allow the user to bend the appendages allowing for the engagement of the clip with the device 100.

The primary function of the fasteners is to keep the lid on against the efforts of dogs. Sufficiently intelligent dogs may discover that they just need to move the grate to get to the cat feces. Additionally, cats often launch themselves horizontally from the lid after using the litter box, and the fasteners prevent the cat from kicking the lid off the box. Finally, the fasteners protect the animal inside the chamber from external animals who wish to bother them.

Figure 4:
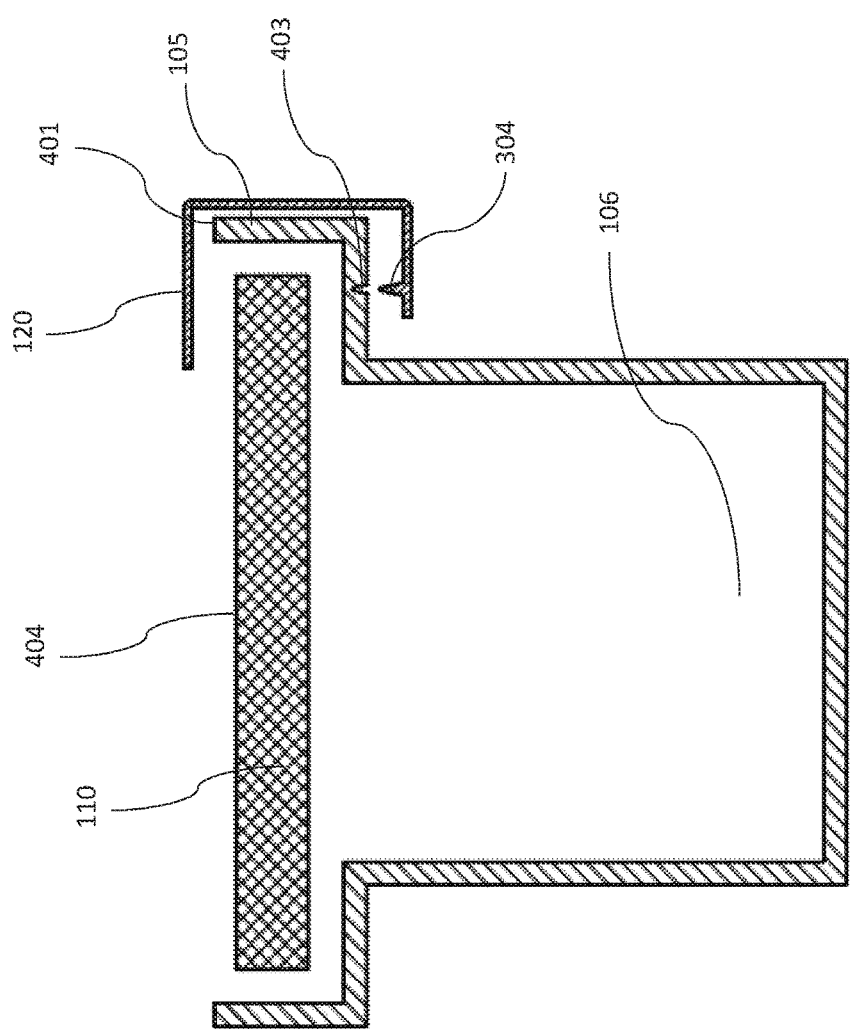
FIG. 4 is a side elevation view of the device, according to an embodiment of the present invention.
Figure 5:
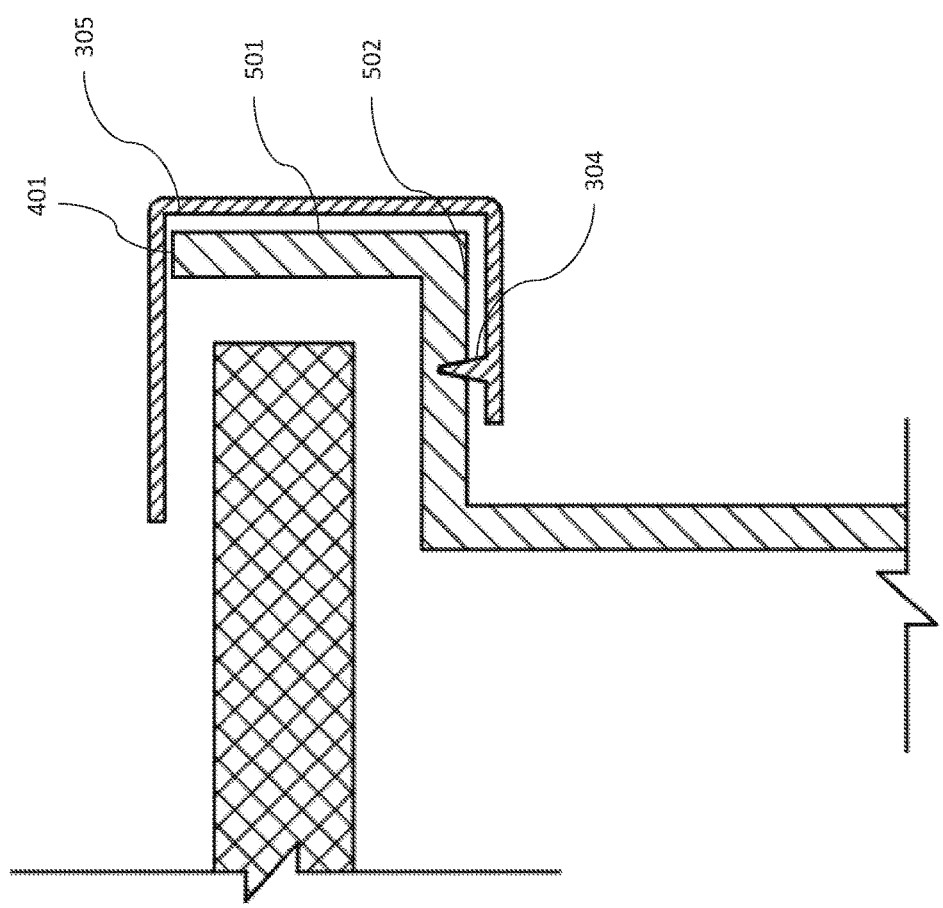
FIG. 5 is a cut-away side elevation view of the fastener engaged with the device, according to an embodiment of the present invention.
Figure 6:
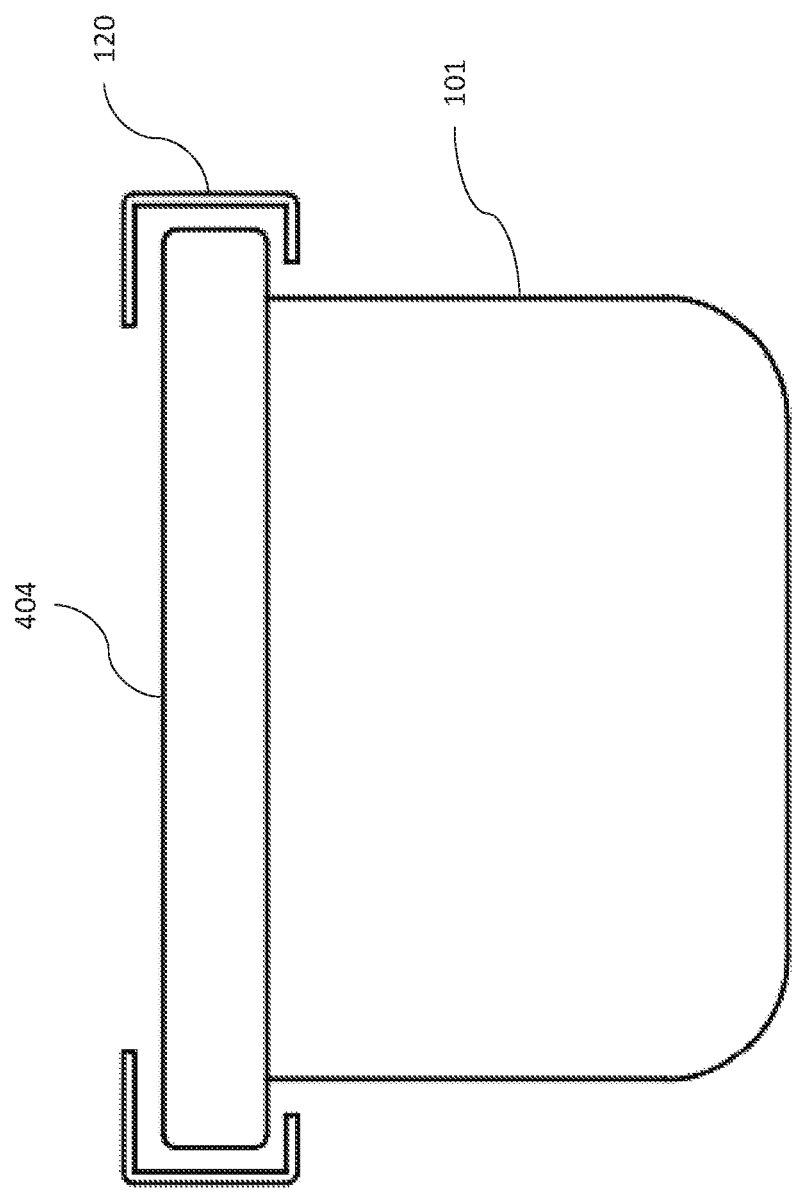
FIG. 6 is a side elevation view of the device, according to an embodiment of the present invention.

FIGS. 4, 5, and 6 illustrate the device having each fastener 120 engaged with the lid 110. In an embodiment of the present invention, the user may engage the fastener 120 by engaging the protrusion on the inner surface 305 with a receiving notch 403 on a bottom surface 502 of the lip, and with the upper surface 401 and the top of the lid 110 for the top portion of the fastener. In an embodiment, the receiving notch 403 comprises a groove or trough underneath and around the circumference of the bottom surface 502, permitting the clips to engage anywhere around the circumference of the top surface. When releasably engaged, the inner surface 305 of the fastener 120 contacts the bottom surface 502 of the lip 104 and the outer surface 501 upper surface 401 of the raised perimeter 105. Preferentially, a plurality of fasteners 120 are positioned around the raised perimeter 105 of the litter box. In an embodiment, the central portion of the contacts the substantially vertical outer surface 501 of the raised perimeter 105.

In an embodiment, at least one of the plurality of fasteners 120 may be releasably affixed to the lid 110. For example, the mating portion 302 of the fastener 120 may be releasably affixed to the top surface 404 of the lid 110. In this embodiment, the protrusion 304, in combination with the receiving notch 403 may be pivotally engaged to function as a pivot for the attachment of the fastener.

The litter box of the present invention may have any basic shape provided that the aperture permits the entrance of cats and restricts the access of dogs and other animals that may feed on the contents therein. The box 101 may be constructed of a variety of metallic and nonmetallic materials such as plastics, aluminum, or fiberglass. It is desirable that the box 101 and sidewalls 102 are impermeable, odor resistant, and mold resistant. The lid is constructed of a sufficiently rigid material to bear the weight of an animal atop the litter box. In all embodiments of the present invention, the lid 110 is removable to facilitate cleaning of the litter box. In alternate embodiments, the lid may be hingedly or slidingly engaged with the box 101.

As described, the dimensions of the litter box and each of the components thereof aid in retaining litter filler and pet waste within the box, as well as keeping unwanted animals, such as dogs, out. In an embodiment, the height from the horizontal base to the top surface of the grate is sized to allow cats to jump onto the top surface 404 (see FIG. 4), while making it difficult for other animals, such as small dogs, to jump atop. Perforations of the grate are dimensions to promote particle disassociation with the cat's paws while restricting appendages from entering the interior of the litter box. The aperture is dimensioned to permit access of a cat while restricting other animals from accessing the interior of the litter box. In a preferred embodiment, the aperture is oblong, having a length greater than a width. The dimensions of the aperture may be ten inches by six inches to achieve the above.

In an embodiment, the height of each sidewall 102 is higher than the average height of a cat's head, in an embodiment, about 4 inches above the cat's head accounting for the litter fill. In an alternate embodiment, the height of each sidewall is at least eight inches. In a preferred embodiment, the height of each sidewall is sixteen inches. Adequate height of the box 100 ensures that the cat within does not throw filler outside of the box 100 when burying excrement, as well as ensuring dogs cannot access the interior 106. The grate also serves as a filter to catch litter moving generally horizontally, reducing litter spread outside the litter box.

In an embodiment, at least the box 101 of the device 100 can be made of an antimicrobial or antibacterial material such, such as plastic embedded with silver particles, or likewise agents as known in the antibacterial/antimicrobial arts. The grate 112 may also be made of an antimicrobial or antibacterial agent.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. A cat litter box comprising:
 a. a circumferential lip having an underside;
 b. a raised perimeter extending from the lip, the raised perimeter having an outer edge; and
 c. a circumferential groove on the underside of the lip;
a lid having an aperture therein, the lid configured to fit within the raised perimeter and rest on the lip, the aperture configured to permit ingress and egress of a cat; and
a plurality of fasteners having an upper appendage and lower appendage, wherein the upper appendage is configured to extend over the perimeter, and the lower appendage comprises a protrusion configured to engage with the groove.

2. The cat litter box of claim 1, wherein the removable lid is configured to mate with the lip and raised perimeter such that a top surface of the lid is coplanar with the top edge of the raised perimeter.

3. The cat litter box of claim 1, wherein the lid further comprises a grate that is textured.

4. The cat litter box of claim 1, wherein the lid further comprises a grate that is porous.

5. The cat litter box of claim 1, wherein the aperture is positioned centrally in the lid such that there is some grate material between an edge of the lid and the aperture.

6. The cat litter box of claim 1 wherein the protrusion pivotally engages with the receiving notch to form a hinge.

7. The cat litter box of claim 1 wherein the box is a molded open box having a bottom and four sides.

8. The cat litter box of claim 7 wherein corners between the four sides are rounded.

* * * * *